US008914276B2

(12) United States Patent
Reitan

(10) Patent No.: US 8,914,276 B2
(45) Date of Patent: Dec. 16, 2014

(54) DYNAMIC VIDEO CAPTION TRANSLATION PLAYER

(75) Inventor: Erik Reitan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 637 days.

(21) Appl. No.: 13/155,390

(22) Filed: Jun. 8, 2011

(65) Prior Publication Data

US 2012/0316860 A1 Dec. 13, 2012

(51) Int. Cl.
G10L 15/26 (2006.01)

(52) U.S. Cl.
USPC .............................. 704/3; 704/275; 348/468

(58) Field of Classification Search
USPC ........................................ 704/3, 235; 348/468
See application file for complete search history.

(56) References Cited

U.S. PATENT DOCUMENTS

| 7,054,804 | B2 | 5/2006 | Gonzales et al. | |
|---|---|---|---|---|
| 7,130,790 | B1* | 10/2006 | Flanagan et al. | 704/2 |
| 7,571,455 | B2* | 8/2009 | Lee | 725/109 |
| 8,554,558 | B2* | 10/2013 | McCarley et al. | 704/235 |
| 2003/0216922 | A1* | 11/2003 | Gonzales et al. | 704/260 |
| 2005/0162551 | A1* | 7/2005 | Baker | 348/468 |
| 2006/0227240 | A1 | 10/2006 | Chiu et al. | |
| 2007/0189724 | A1* | 8/2007 | Wan et al. | 386/96 |
| 2008/0052061 | A1 | 2/2008 | Kim et al. | |
| 2008/0284910 | A1* | 11/2008 | Erskine et al. | 348/468 |
| 2009/0132232 | A1* | 5/2009 | Trefler | 704/2 |
| 2010/0118189 | A1 | 5/2010 | Ayoub et al. | |
| 2010/0265397 | A1* | 10/2010 | Dasher et al. | 348/468 |

OTHER PUBLICATIONS

"Translated captions for silverlight videos—it is dynamic!", Retrieved at <<http://blogs.msdn.com/b/aspnetue/archive/2010/08/13/translated-captions-for-silverlight-videos-it-s-dynamic.aspx>>, Aug. 13, 2010, pp. 6.
"Subtitle Edit", Retrieved at <<http://www.nikse.dk/SubtitleEdit>>, Retrieved Date: Apr. 4, 2011, pp. 5.

* cited by examiner

Primary Examiner — Daniel D Abebe
(74) Attorney, Agent, or Firm — Ben Tabor; Kate Drakos; Micky Minhas

(57) ABSTRACT

A caption translation system is described herein that provides a way to reach a greater world-wide audience when displaying video content by providing dynamically translated captions based on the language the user has selected for their browser. The system provides machine-translated captions to accompany the video content by determining the language the user has selected for their browser or a manual language selection of the user. The system uses the language value to invoke an automated translation application-programming interface that returns translated caption text in the selected language. The system can use one or more well-known caption formats to store the translated captions, so that video playing applications that know how to consume captions can automatically display the translated captions. The video playing application plays back the video file and displays captions in the user's language.

20 Claims, 3 Drawing Sheets ern. Digital video is often not translated such that an audio track is provided for every language, as translation and voice overs are expensive and time consuming. Thus, many digital video files can only be understood by speakers of a particular language.
DYNAMIC VIDEO CAPTION TRANSLATION PLAYER

BACKGROUND

There are many available platforms for playing digital video on the web. MICROSOFT™ SILVERLIGHT™ and ADOBE™ FLASH™ are two web-based runtime platforms that provide the ability to package and run applications within a web browser that include digital video. Web browsers may provide access to hardware resources for efficiently playing back video and sound to select browser components, such as a trusted runtime. These components can play video with efficiency close to that of digital video playing natively on a desktop computer system.

The Internet and internal corporate networks contain a large amount of digital video content. Video sites such as YouTube, instructional videos provided by training companies, websites that contain helpful information, and many other sources include millions of videos that can be accessed and viewed by people using a web browser. A few languages predominate much web content, and individual countries often have a large body of digital video in each country's native language. Digital video is often not translated such that an audio track is provided for every language, as translation and voice overs are expensive and time consuming. Thus, many digital video files can only be understood by speakers of a particular language.

Digital videos often contain captions that display written text of the words being spoken in the digital videos. Captions are helpful for users that are hearing impaired or for watching videos in circumstances where audible noise is not possible or impolite. Most videos include captions only in the same language as the spoken audio track. Some videos may include captions in two major languages, but rarely more. Translating captions has also traditionally been time consuming and expensive, thus content producers typically target a primary audience and provide captions in that language. This makes a wealth of digital videos unavailable to speakers of other languages.

SUMMARY

A caption translation system is described herein that provides a way to reach a greater world-wide audience when displaying video content by providing dynamically translated captions based on the language the user has selected for their browser. The system may be web-based and can dynamically translate captions for instructional-based or other videos. The system provides machine-translated captions to accompany the video content by determining the language the user has selected for their browser or a manual language selection of the user. The system uses the language value to invoke an automated translation application-programming interface (API) that returns translated caption text in the selected language. The system can use one or more well-known caption formats to store the translated captions, so that video playing applications that know how to consume the caption format can automatically display the translated captions. The caption format can be contained in a file (e.g., dfxp), in memory as an object, or in other formats. The video playing application plays back the video file and displays captions in the user's language. In some embodiments, the system exposes an API that applications or web services can embed to encapsulate the entire process of translating captions and building a video playback package with the translated captions. Thus, the system opens digital video to a much broader audience. For any video that includes captions in at least one language, language is no longer a barrier for anyone viewing the video after captions have been translated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
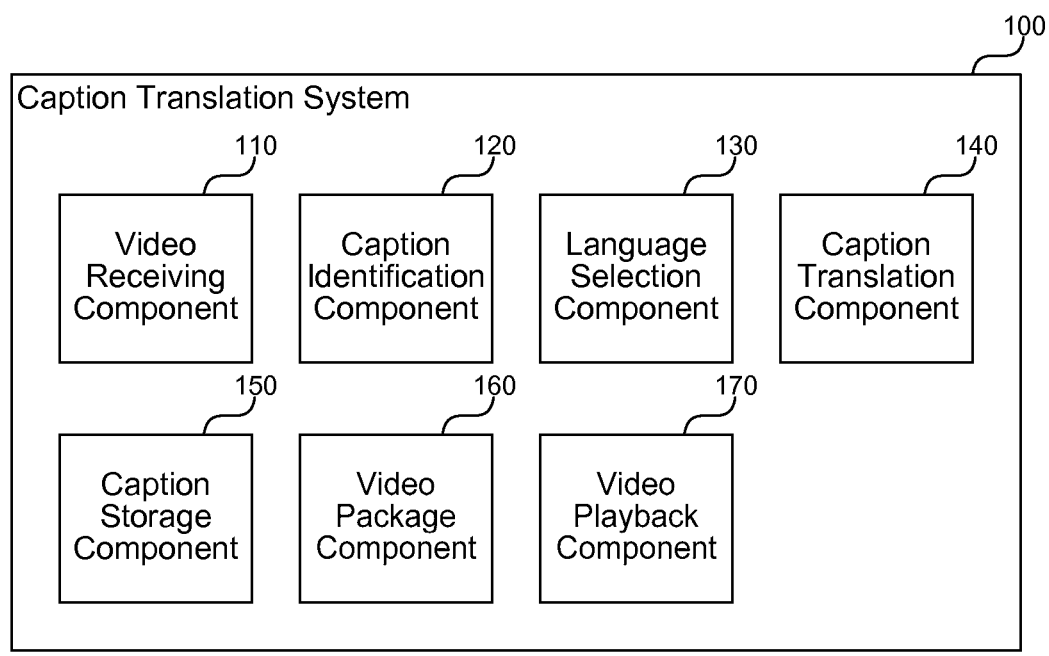
FIG. 1 is a block diagram that illustrates components of the caption translation system, in one embodiment.

A caption translation system is described herein that provides a way to reach a greater world-wide audience when displaying video content by providing dynamically translated captions based on the language the user has selected for their browser. The caption translation system may be web-based and can dynamically translate captions for instructional-based or other videos. The system provides machine-translated captions to accompany the video content by determining the language the user has selected for their browser or a manual language selection of the user. The system uses the language value to invoke an automated translation application-programming interface (API) (e.g., the MICROSOFT™ Translator or other API). The automated translation API returns translated caption text in the selected language. The system can use one or more caption storage resources, such as a well-known caption file format (e.g., dfxp) or in-memory object to store the translated captions, so that video playing applications that know how to consume these caption storage resources can automatically display the translated captions. For example, the MICROSOFT™ Media Platform (formerly the SILVERLIGHT™ Media Framework) can play video with captions stored in a caption file. The video playing application plays back the video file and displays captions in the user's language. In some embodiments, the system exposes an API (e.g., a WebMatrix helper) that applications or web services can embed to encapsulate the entire process of translating captions and building a video playback package with the translated captions.

The caption translation system provides dynamic translation upon request using a translation API or web-based translation service. For example, the system can use the MICROSOFT™ Translator API to translate existing captions contained in a video caption file (.dfxp) and populates a new video caption file (.dfxp) with the translated captions based on the a selected language. In some embodiments, the system caches the result so that the translation is performed only once per language. The system can accept any source language and any destination language supported by the translation API, so source captions need not be in English. This allows English speakers to gain access to a whole set of videos that are not currently in English. The system provides a scalable solution that can handle many requests, so that the system can be offered as a service, if desired. In some embodiments, the system leverages a standard video caption format to provide compatibility with existing tool chains. For example, the MICROSOFT™ Media Platform (formerly the SILVERLIGHT™ Media Framework) and MICROSOFT™ Expression Encoder 4 both support the .dfxp video caption file standard. Thus, the system opens digital video to a much broader audience. For any video that includes captions in at least one language, language is no longer a barrier for anyone viewing the video after captions have been translated.

The caption translation system provides translated captions to accompany instructional based or other digital video. In some embodiments, the system begins by checking the browser locale of a browser used to access web-based video and separates out the browser language. This value is later used to translate the source captions into the target language and to name a translated caption file or translated caption object that contains the translated captions. When using a caption file as the caption storage resource, if a caption file already exists for the specific browser language, the system uses the existing translations contained in the translated caption file. However, if there is no caption file for the browser language, a new extensible markup language (XML) or other file is created that will contain the translated captions. As an alternative to a caption file, the system can use an object containing the translated captions. Next, the system parses a source caption file and generates a list of source caption strings. Caption files include more than just strings of text, such as markers that indicate how to synchronize the captions and video. The system then translates the list of source captions based on the source language and target language using a translation API or service. The system can translate all of the strings in a single call to the translation API to reduce burden on a translation server. The new caption file that is named based on the target language is updated with the translated captions. The system then generates a video playback package (e.g., a SILVERLIGHT™ player from a compiled SILVERLIGHT™ application) and passes the expected media file path and the caption file path to the playback package for playback. The player hosted in a web browser then displays the video and translated captions to the user.

FIG. 1 is a block diagram that illustrates components of the caption translation system, in one embodiment. The system 100 includes a video receiving component 110, a caption identification component 120, a language selection component 130, a caption translation component 140, a caption storage component 150, a video package component 160, and a video playback component 170. Each of these components is described in further detail herein.

The video receiving component 110 receives an identification of a digital video. The identification may include a uniform resource locator (URL), file path, or other specification of a particular video and where the video can be accessed. In some embodiments, the system operates as part of a browser and receives the identification of the video after a user directs the browser to a web page containing the video. In some embodiments, the system operates at a web server that delivers digital video to clients, and determines upon receiving a client request whether captions for the identified video are available in a language associated with the client request. Web browsers commonly provide language information when connecting to web servers and the web server can access this information to identify a target language for video captions.

The caption identification component 120 identifies captions associated with the identified digital video, wherein the captions have a source language. Captions may be stored along with the video or in a separate file stored with the video. The caption resource may include a series of strings of text that are to be displayed as the video plays, and may include markers to indicate times or other indicators within the video at which to display each text string. The system may determine whether the captions already match the user's browser language to determine whether translation is needed.

The language selection component 130 selects a target language associated with a user that requests playback of the identified digital video. The target language may be specified in a browser request, or may be manually provided by the user. In some cases, a website may store a user profile that includes the user's selected target language. Upon receiving a request to playback video, the system 100 can access the user's profile and determine the selected language. The component 130 may allow any language or may limit the user to a subset of languages, such as those supported by the caption translation component 140. In some cases, a bilingual user may select among multiple languages to which to translate captions that the user can read.

The caption translation component 140 translates text strings from a source language to a target language, and receives the captions identified by the caption identification component in the source language, receives the selected target language, and performs a translation. The component 140 may operate as a web service, local API, email service, or any other type of automated agent that can receive a list of text strings in one language and provide a list of text strings in another language. The system may provide multiple strings to the component 140 at a time to increase scalability of the component 140 and avoid repeated calls to translate text. In some embodiments, the component 140 caches captions for previously translated target languages. The captions can be cached either at a translation server, at a requesting server, or both. Caching at the requesting server avoids calls to the translation server and improves performance even more.

The caption storage component 150 stores translated captions in a caption format that can be read by at least one video playback application. The component 150 may allow the client to request one among multiple formats for storing the caption. The component 150 may also automatically select a format that is compatible with a broad range of video playback applications and tools. The format may include an XML-based or other hierarchical storage format that organizes the caption strings along with metadata used to know when to display each string to synchronize with the displayed video. The stored captions may also be kept in an in-memory object. The caption storage component 150 may store multiple languages in a single caption file or multiple separate caption files, one for each language. In some embodiments, the caption translation component 140 may translate captions into all languages in response to each request so that only one call is used for each digital video. The system 100 may also include a batch process for translating a group of videos at a specific time, such as a non-peak time for the translation component 140. These and other details may vary per implementation based on performance or other considerations.

The video package component 160 packages information for playing back the identified digital video using the translated captions for access by a client. In some cases, a web server may create a web page with an embedded link that specifies an application package with a video playback application and path information for invoking the playback application to display the translated captions upon playing the video. The video can be packaged according to any particular implementation and the expected types of clients that will access the video. In some cases, the system selects a type of package based on a web browser that requests the video. Some web browsers are compatible with different video playback technologies than others. The system 100 may cache video package information for different browsers so that information for each browser is only generated once per video.

The video playback component 170 includes an application that plays digital video and can display the translated captions to a user using hardware of a computing device associated with the user. The component 170 may include a browser-based application, such as a SILVERLIGHT™ or FLASH™ application for playing video, a standalone video player, or other technology for playing video. The video player accesses one or more browser or operating system APIs for playing back video, which then accesses hardware of the computing device, such as a graphical processing unit (GPU), central processing unit (CPU), and screen.

The computing device on which the caption translation system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
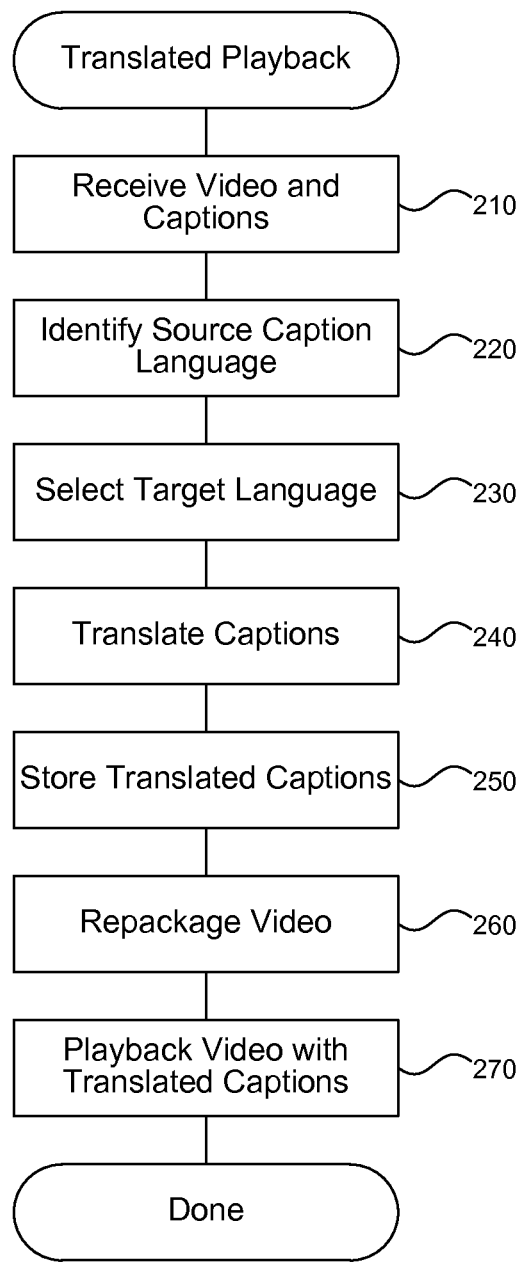
FIG. 2 is a flow diagram that illustrates processing of the caption translation system to provide automated translation of video captions and playback to one or more clients, in one embodiment.

FIG. 2 is a flow diagram that illustrates processing of the caption translation system to provide automated translation of video captions and playback to one or more clients, in one embodiment.

Beginning in block 210, the system receives an indication of a video that includes associated caption text. The system may receive the video via a URL or other identifier. In some cases, the system may provide translation of captions for videos hosted at a third party website. In other cases, the system hosts videos itself and provides translation as needed based on client requests for translation.

Continuing in block 220, the system identifies a source language associated with the caption text. The captions may include a language identifier or the system may automatically detect the caption language (e.g., based on common language words or by providing the text to an API that can determine language). The received video may include captions in multiple languages, and the system may identify each language and select a source set of captions to use for translation.

Continuing in block 230, the system selects a target language to which to translate the associated caption text from the identified source language. The system may automatically select the target language using a browser language setting, user profile information, source Internet Protocol (IP) address of the received request, or any other information. In other cases, the system may receive a selection of language from a user or from a host of the video that provides videos to users of a particular language.

Continuing in block 240, the system translates the caption text from the identified source language to the selected target language. The system may translate text by passing the source caption text as a parameter to a translation API and providing the target language and source language as additional parameters. The translation API returns translated text in the requested target language. In some cases, the system translates text by first accessing a cache to determine if a previous translation of the text has already been performed. If a previous translation exists, then the system accesses the previously translated text and provides the translated text as output.

Continuing in block 250, the system optionally stores the translated captions. In some cases, the system may not store captions and instead request translated captions in response to each client request. In other cases, the system stores the captions in a common caption file format that can be read by video playback applications and/or video authoring tools. In some cases, an administrator may open translated caption files in an authoring tool to clean up captions or perform other actions. The system uses a common format to allow a broad range of compatibility with existing tools. The system may also store the translated captions in a cache, such as an in-memory object, to avoid future requests to the translation API for already translated captions.

Continuing in block 260, the system repackages the received video and translated captions so that the video can be played with the new captions. Repackaging may include forming a link with a specification of a path to the translated captions, creating an application package that includes the video and captions, or other actions to provide the video and captions to a client computing device for playback.

Continuing in block 270, the system plays the received video and displays each translated caption at appropriate points during the video. The system may operate from a web browser and playback may occur through a web-based application that plays the video and loads captions from the stored format. The system may also operate from a standalone application that plays the video and reads the stored captions from the same or a separate file from the video. After block 270, these steps conclude.

Figure 3:
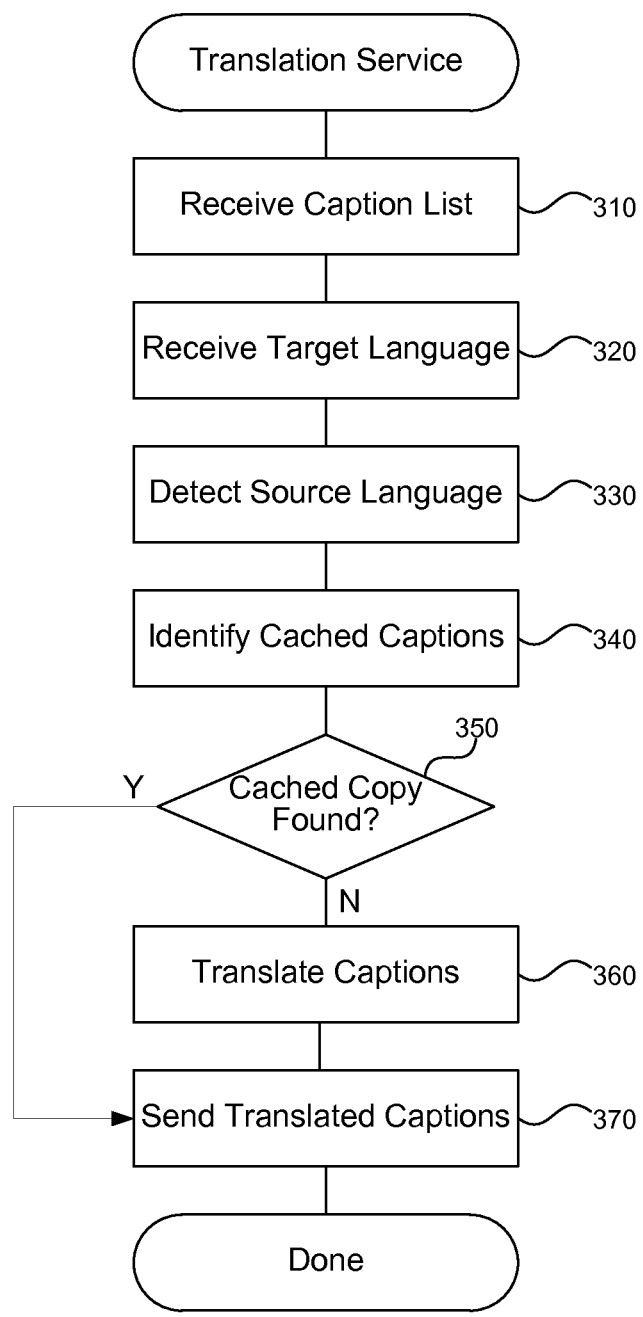
FIG. 3 is a flow diagram that illustrates processing of the caption translation system to handle automated translation requests at a web translation service, in one embodiment.

FIG. 3 is a flow diagram that illustrates processing of the caption translation system to handle automated translation requests at a web translation service, in one embodiment.

Beginning in block 310, the system receives a list of captions to translate. The system may receive the captions at a translation service from a web server that hosts video files with captions in a single language or limited number of languages. The system may provide an API through which requestors can submit the list of captions using a web service call or other programmatic method call. The system extracts the list of captions from the request and continues to translate the received captions.

Continuing in block 320, the system receives a target language to which to translate the received list of captions. The target language may be selected from a list of target languages provided by a translation API for automatically translating text without user intervention. If the received target language is not supported, then the system may automatically select a different target language that is close or often spoken by speakers of the received target language or may not translate the text.

Continuing in block 330, the system detects a source language of the received list of captions. The list may include a parameter or other information that specifies the source language. Alternatively or additionally, the system may automatically detect the source language using the translation API or other heuristics or methods. The translation API uses the source and target languages to load appropriate language translation code for automatically translating the received list of captions.

Continuing in block 340, the system attempts to identify a cached set of captions in the received target language. In some cases, a previous request may have already invoked the system to translate the received list of captions into the received target language. Because translation can be computationally intensive work, the system may opt to cache completed translations. The system may set a certain amount of time before expiring items in the cache so that the cache does not grow unduly large over time. So long as translated text for the list of received captions is requested regularly, the system will keep the cached copy and respond from the cache without performing a new translation.

Continuing in decision block 350, if the system finds a cached copy of the captions, then the system jumps to block 370, else the system continues at block 360. The system may create a hash key or other cache identification mechanism based on the received list of captions to efficiently determine whether a translated version of the list of captions is already available in the cache.

Continuing in block 360, the system translates the received list of captions from the detected source language to the requested target language that was received. The translation invokes a software module for automatically generating translated text from source text. Translation APIs are available from several publicly available components that are well known in the art. The components use natural language processing techniques to automatically process received text and generate translated text. The system may store the translated captions in a cache for efficiently handling future requests for the same captions.

Continuing in block 370, the system sends the translated captions as a response to a sender of the original captions. The system may provide the translated captions in a file, as a web post, as a web service response, or through any other data communication method. The system sends the translated captions to the sender, which then provides the captions during playback of a video associated with the captions. After block 370, these steps conclude.

The following is example code in C# for an ASP.NET Web Pages with Razor Syntax application that implements the functionality of the caption translation system described herein. The GetHtml function is a ASP.NET Web Pages with Razor Syntax caption helper that provides an identified video with automatically translated captions.

```
public static IHtml String GetHtml(
    string xapFilePath, // path to playback application
    string mediaFilePath, // path to video
    string captionFilePath, // path to captions
    string sourceLanguage, // source language of captions
    string newLanguage, // target language of captions
    string translationAppID, // ID from Translator website
    string width = "640", // width of player
    string height = "480") // height of player
{
```

-continued

```
    // Call the steps to convert caption file.
    // Set the translation appId which was obtained from Translator
    AppId = translationAppID;
    // Create the new language-specific caption file name.
    char[ ] delimiterChar = {'.'};
    string[ ] subFileName = captionFilePath.Split(delimiterChar);
    string newFileName = subFileName [0] + "." + newLanguage +
".xml";
    // Translate the caption file if it does not exist. However, if
it does exist,
    // use the existing translation file.
    if (!File.Exists(myServer.MapPath(newFileName))) {
        // Copy the xml file.
        string copySuccess = copyXMLFile(captionFilePath,
newFileName, newLanguage);
        // Create List<string> of captions.
        List<string> captionList =
getTextFromFile(captionFilePath);
        // Translate captions.
        List<string> translatedCaptionList =
translateCaptions(captionList, sourceLanguage, newLanguage);
        // Replace translated captions in the copied file with
translated captions.
        replaceTranslatedCaptions(newFileName,
translatedCaptionList);
    }
    // Generate the HTML
    string html = GenerateCode(xapFilePath, mediaFilePath,
newFileName, width, height);
    return new HtmlString(html);
}
```

The following code illustrates a function for generating HTML that references the translated captions.

```
private static string GenerateCode(
    string path,
    string mediaFilePath,
    string captionFilePath,
    string width,
    string height)
{
    char[ ] delimiterChar = { '/' };
    string[ ] mediaFile = mediaFilePath.Split(delimiterChar);
    mediaFilePath = mediaFile[mediaFile.Length – 1];
    string[ ] captionFile = captionFilePath.Split(delimiterChar);
    captionFilePath = captionFile[mediaFile.Length – 1];
    StringBuilder builder = new StringBuilder( );
    builder.AppendLine("<object ");
    builder.Append(string.Format("width = '{0}'", width));
    builder.Append(string.Format("height = '{0}'", height));
    builder.Append("type='application/x-silverlight-2'
data='data:application/x-silverlight-2,' >");
    builder.AppendLine(" <param name='source'");
    builder.Append(string.Format("value = '{0}'/>", path));
    builder.Append("<param name='initParams'");
    builder.Append(string.Format("value = '{0}'/>",
"mediaFilePath=" + mediaFilePath + ",captionFilePath=" +
captionFilePath));
    builder.AppendLine("</object>");
    return builder.ToString( );
}
```

In some embodiments, the caption translation system receives the target language from a browser query string. In some cases, users may wish to override their browser's language setting and receive captions in another language. The system can provide a user interface control or other interface for allowing the user to select another language, and can send the selected language to the web server through a query string or similar mechanism.

In some embodiments, the caption translation system also translates audio associated with a digital video. Videos typically contain a single audio stream in a particular language. The system can provide the audio stream to a translation API that supports translation of audio and can receive translated audio to playback when the video is played. In some embodiments, the system operates on videos without source captions by performing speech-to-text processing on the audio stream and generating source captions automatically. The system may also read translated captions using text-to-speech processing on the client.

In some embodiments, the caption translation system receives user edits that correct translated text. Automated translation may not produce correct results in some cases, and the system can benefit from user submissions to correct any errors. In addition, the system can further provide any corrections back to the translation host, which can use the feedback to improve the automated translation over time.

From the foregoing, it will be appreciated that specific embodiments of the caption translation system have been described herein for purposes of illustration, but that various modifications may be made without deviating from the spirit and scope of the invention. Accordingly, the invention is not limited except as by the appended claims.

I claim:

1. A computer-implemented method to provide automated translation of video captions and playback to one or more clients, the method comprising:
   receiving an indication of a video that includes associated caption text;
   identifying a source language associated with the caption text without playing the video;
   selecting a target language to which to translate the associated caption text from the identified source language;
   automatically translating the caption text from the identified source language to the selected target language without playing the video;
   storing the translated captions in a caption file after automatically translating the caption text;
   repackaging the received video and translated captions so that the video can be played with the new captions; and
   playing the received video and displaying each translated caption at appropriate points during the video,
   wherein the preceding steps are performed by at least one processor.

2. The method of claim 1 wherein receiving the video comprises the video via a uniform resource locator (URL) or Uniform Resource Identifier (URI) that specifies a path to the video.

3. The method of claim 1 wherein receiving the video comprises providing a path to a video host that hosts the video and provides automated translation as needed based on client requests for translation.

4. The method of claim 1 wherein identifying the source language comprises accessing a language identifier stored with the caption text.

5. The method of claim 1 wherein identifying the source language comprises automatically detecting the caption language.

6. The method of claim 1 wherein selecting the target language comprises automatically selecting the target language based on a browser language setting.

7. The method of claim 1 wherein selecting the target language comprises receiving a selection of language from a user.

8. The method of claim 1 wherein automatically translating the caption text comprises passing the source caption text as a parameter to a translation application-programming interface (API).

9. The method of claim 1 wherein automatically translating the caption text comprises accessing a cache to determine whether a previous translation of the text has already been performed.

10. The method of claim 1 wherein storing the translated captions comprises storing the captions in a common caption file format that can be read by video playback applications and/or video authoring tools.

11. The method of claim 1 wherein storing the translated captions comprises storing the translated captions in a cache to avoid future requests to the translation API for already translated captions.

12. The method of claim 1 wherein repacking comprises forming a link with a specification of a path to the translated captions.

13. The method of claim 1 wherein playing the received video comprises from a web browser playing the video and translated captions through a web-based application that plays the video and loads captions from the stored format.

14. A computer system for providing a dynamic video caption translation player, the system comprising:
   a processor and memory configured to execute software instructions embodied within the following components;
   a video receiving component that receives an identification of a digital video;
   a caption identification component that identifies captions associated with the identified digital video without playing the identified digital video, wherein the captions have a source language;
   a language selection component that selects a target language associated with a user requesting playback of the identified digital video;
   a caption translation component that receives the captions identified by the caption identification component in the source language, receives the selected target language, and performs an automated translation;
   a caption storage component that stores translated captions in a caption format that can be read by at least one video playback application;
   a video package component that packages information for playing back the identified digital video using the translated captions for access by a client; and
   a video playback component that includes an application that plays digital video and can display the translated captions to a user using hardware of a computing device associated with the user.

15. The system of claim 14 wherein the video receiving component operates as part of a web browser and receives the identification of the video after a user directs the browser to a web page containing the video.

16. The system of claim 14 wherein the language selection component receives the target language in a web browser request through the browser's current language setting.

17. The system of claim 14 wherein the language selection component receives the target language by accessing a user profile.

18. The system of claim 14 wherein the caption translation component translates all of the caption strings in one call to a translation service to increase scalability and avoid repeated calls to translate text.

19. The system of claim 14 wherein the caption translation component caches captions for previously translated target languages.

20. A computer-readable storage medium comprising instructions for controlling a computer system to handle automated translation requests at a web translation service, wherein the instructions, upon execution, cause a processor to perform actions comprising:
- receiving a list of captions to translate at a translation service from a web server that hosts video files with captions in a source language;
- receiving a target language to which to translate the received list of captions;
- detecting a source language of the received list of captions;
- attempting to identify a cached set of captions in the received target language;
- if no cached copy of the captions is found, automatically translating the received list of captions from the detected source language to the requested target language that was received; and
- sending the translated captions as a response to a sender of the original captions.

* * * * *